(12) United States Patent
Lingard

(10) Patent No.: US 8,166,915 B2
(45) Date of Patent: May 1, 2012

(54) DEVICE FOR REMOVING AT LEAST ONE TEAT CUP FROM A TEAT OF AN ANIMAL

(75) Inventor: Mike Lingard, Hamilton (NZ)

(73) Assignee: DeLaval Holding AB, Tumba (SE)

( * ) Notice: Subject to any disclaimer, the term of this patent is extended or adjusted under 35 U.S.C. 154(b) by 134 days.

(21) Appl. No.: 12/741,053

(22) PCT Filed: Oct. 30, 2008

(86) PCT No.: PCT/SE2008/051237
§ 371 (c)(1),
(2), (4) Date: May 3, 2010

(87) PCT Pub. No.: WO2009/058088
PCT Pub. Date: May 7, 2009

(65) Prior Publication Data
US 2010/0251965 A1    Oct. 7, 2010

(30) Foreign Application Priority Data

Nov. 1, 2007   (SE) ...................................... 0702421

(51) Int. Cl.
*A01J 5/017* (2006.01)

(52) U.S. Cl. ....................... 119/14.08; 119/14.1; 91/422

(58) Field of Classification Search ............... 119/14.08, 119/14.43, 14.05, 14.18, 14.27, 14.37, 14.38, 119/14.39, 14.1; 261/62–63.6; 137/517, 137/541; 92/181 R, 181 P; 91/422
See application file for complete search history.

(56) References Cited

U.S. PATENT DOCUMENTS

| 3,690,300 | A | * | 9/1972 | Tonelli | 119/14.08 |
| 3,957,018 | A | | 5/1976 | Barrett | |
| 4,347,868 | A | * | 9/1982 | Scott | 137/462 |
| 4,366,831 | A | | 1/1983 | Scott | |
| 4,523,545 | A | * | 6/1985 | Kummer | 119/14.08 |
| 2002/0040637 | A1 | * | 4/2002 | Niwa et al. | 91/422 |

FOREIGN PATENT DOCUMENTS

| AU | 519720 | 1/1979 |
| EP | 0 065 871 | 12/1982 |

OTHER PUBLICATIONS

International Search Report dated Jan. 28, 2009, from corresponding PCT application.

* cited by examiner

*Primary Examiner* — Rob Swiatek
*Assistant Examiner* — Kathleen Iwasaki
(74) *Attorney, Agent, or Firm* — Young & Thompson

(57) ABSTRACT

A device for removing at least one teat cup (1a) from a teat of an animal includes i) a cylinder (2) provided with a movable piston (3) dividing an inner space of the cylinder in a first compartment (4) and a second compartment (5), ii) a valve mechanism (9) adapted to connect a vacuum source (8) to the first compartment (4) when it is in a first position and to break this connection when it is in a second position, iii) a passage (15) leading into the first chamber (4), and iv) a valve member (16) adapted to allow a flow through the passage (15) to the first compartment (4) during occasions when an operator moves the teat cup (1a) from a storing position to a teat attaching position.

17 Claims, 5 Drawing Sheets

DEVICE FOR REMOVING AT LEAST ONE TEAT CUP FROM A TEAT OF AN ANIMAL

BACKGROUND OF THE INVENTION AND PRIOR ART

The present invention relates to a device for removing at least one teat cup from a teat of an animal, wherein the device comprises a cylinder provided with a movable piston dividing an inner space of the cylinder in a first compartment and a second compartment permanently connected to ambient air, connecting means adapted to constitute a connection between the piston and the at least one teat cup, a valve mechanism adapted to connect a vacuum source to the first compartment when it is in a first position and to break this connection when it is in a second position, and wherein the piston is adapted to provide a motion, when the valve mechanism is in the first position, which removes the at least one teat cup from the animal and moves it to a teat cup storing position.

Such a cylinder can be adapted to remove a claw with four teat cups from an animal. However, it is also possible to use several removing cylinders in a milking stall which each removes one teat cup from the animal. Removing cylinders comprise a movable piston connected to the claw by means of a cord or the like. Removing cylinders are usually activated by a vacuum source. The cylinders have a first compartment on one side of the piston, which is connectable to the vacuum source by means of a valve mechanism, and a second compartment on the opposite side of the piston, which is permanently connected to ambient air. When a milking process of an animal has been finished, the valve mechanism connects the vacuum source to the first compartment of the cylinder such that the piston and the cord provide a motion which removes the teat cups from the animal and brings them to a teat cup storing position.

When the teat cups are to be attached to an animal, the valve mechanism is moved to a position in which it supplies air of ambient pressure to the first compartment. Since ambient pressure now is present in the compartments on both sides of the piston, it is possible for an operator to grip the teat cups in the storing positions and move them together with a corresponding motion of the cord and the piston to a teat cup attaching position. However, the motion of the piston creates an expansion of the space in the first compartment and a reduction of the space in the second compartment. Even if both compartments are connected to ambient air, this motion inevitably creates a certain negative pressure in the expanding first compartment and a certain positive pressure in the contracting second compartment. However, the air passage, through which air is sucked into the first chamber, has many times a higher flow resistance than the air passage through which air leaves the second compartment. Especially, if the motion is performed with a high speed, a relatively large negative pressure can be created in the first chamber, which significantly counteracts the motion of the piston. In this case, an operator has to supply a relatively large force for moving the teat cups from a storing position to a teat cup attaching position. In larger milking arrangement, when this motion is repeated frequently, this work can be strenuous for the operators.

U.S. Pat. No. 3,957,018 shows a milking apparatus including a removing cylinder comprising a movable piston, which is connected to a cluster by means of a cord. The piston divides the cylinder in a first compartment and a second compartment. The action of the removing cylinder is controlled by means of a valve mechanism adapted to connect the first compartment to a vacuum source or to ambient air. When an operator moves the cluster to a teat cup attaching position, air is supplied to the expanding first compartment through an air passage defined by a valve mechanism and a conduit, which both seem to have relatively small dimensions. Furthermore, air is removed from the contracting second compartment through a small opening for the cord in a bottom portion during this motion. Especially, if the operator moves the claw with a high speed to the teat attaching position, it is a great risk that the air supply to the first compartment and the discharging of air from the second compartment will be insufficient. In this case, a relatively large pressure difference can be created on the opposite sides if the piston. Thus, it could be a relatively hard work for an operator to move the cluster to the teat cup attaching position.

SUMMARY OF THE INVENTION

The object of the present invention is to provide a removing cylinder having a design which makes it possible for an operator to move at least one teat cup which is connected to a piston in the cylinder from a storing position to a teat attaching position by a relatively small force.

This object is obtained according to the invention by the feature that the device comprises a passage leading into the first compartment and a valve member separate from the valve mechanism, which valve member allows a flow of air through the passage to the first compartment in an open position and prevents such a flow in a closed position, wherein the valve member is adapted to be moved to the open position when the valve mechanism is in the second position. Consequently, the valve member is in the open position at occasions when an operator moves the at least one teat cup to a teat cup attaching position. This motion of the operator results in a corresponding motion of the piston in the cylinder. The motion of the piston leads to an expansion of the first compartment and a contraction of the second compartment. Consequently, air is sucked into the first compartment at the same time as air is pressed out of the second compartment. Usually, the air passage, through which air is sucked into the first chamber, has a considerably higher flow resistance than the air passage through which air is pressed out of the second compartment. Therefore, the negative pressure in the first chamber usually causes the main part of the pressure difference acting on the piston. The existence of the valve member and the additional passage leading into the first chamber facilitates the air supply to the first chamber and counteracts the creation of a negative pressure in the first compartment. It is therefore possible to move the at least one teat cup from a storing position to a teat cup attaching position by a lower force and with a higher speed than with a conventional device. The passage leading into the first compartment can have an extension between the first compartment and an air source with ambient pressure. In this case, the passage can have an extension trough a wall of the cylinder between the first compartment and ambient air located outside the cylinder. The valve member can here be attached to the cylinder wall.

According to a preferred embodiment of the invention, said passage has an extension through the piston. In this case, air can flow direct from the second compartment to the first compartment through the passage. Such a direct flow of air reduces at least partly the need of air supply to the first compartment and air discharge from the second compartment by separate passages. Consequently, the existence of the valve member and such a passage between the compartments counteracts in a very effective manner the creation of a pressure difference on the opposite sides of the piston during this motion. Such a passage can be very short and have a low flow resistance. Preferably, the valve member is attached to the piston. The valve member can be mounted on a surface of the piston or inside the piston. The valve member may be adapted to be controlled by a pressure difference between the first compartment and ambient pressure such that it is moved to the open position as soon as the pressure difference is lower than a predetermined value. When the pressure difference between the first compartment and ambient pressure decreases, it is a sure indication that the valve mechanism has been moved to the second position. In such a manner, the valve member will be automatically moved to the open position as soon as the valve mechanism has been moved to the second position.

According to a further embodiment of the invention, the valve member may comprise a movable valve element, which is movably arranged between the open position in which it allows a flow of air through the passage and a closed position in which it blocks the passage. A valve member provided with such a valve element can be given a simple design and a reliable function. The valve element may be adapted to be moved to the open position by the force of gravity when the valve mechanism has been moved to the second position. As soon as the pressure difference between the first compartment and ambient pressure drops below said predetermined value, the valve element falls downwardly to an open position by gravity. The valve element may be a ball element. A ball element is a simple element which can easily be moved between an open position and a closed position in the valve member.

According to a further embodiment of the invention, the movable element is adapted to be moved to the open position by resilient means when the valve mechanism has been moved to the second position. The resilient means can act on the movable valve element in a manner such that it moves the valve element to the open position as soon as the pressure difference between the compartments drops below said predetermined value. The valve element may be a movable piston element and the resilient means may be a spring element. A valve member including these components can be manufactured in a simple manner and have a reliable function. Alternatively, the valve element is a membrane element having elastic properties adapted to move it to the open position when the valve mechanism has been moved to the second position. The membrane element can here be moved to the closed position by means of the pressure difference between the compartments. As soon as the pressure difference drops below said predetermined value, the membrane element is adapted to be moved to the open position by means of its elastic properties.

According to a further embodiment of the invention, the valve member is adapted to be controlled by the pressure difference between the first compartment and ambient air such that it is moved to the closed position as soon as the pressure difference between the compartments is higher than a predetermined value. When the pressure difference between the compartments suddenly increases to a considerably higher value, it is a sure indication that the valve mechanism has been moved from the second position to the first position. In such a manner, the valve member will be automatically moved to the closed position at substantially the same time as the valve mechanism is moved to the first position. In the closed position, the valve member maintains the pressure different between the compartments such that the cylinder obtains corresponding properties as a conventional cylinder during the removing process of the at least one teat cup from an animal when a milking process has been finished.

According to a preferred embodiment of the invention, the device comprises at least one passage connecting the second compartment to ambient air when it is in the second position. Consequently, when the valve mechanism has been moved to the second position, air flows into the first compartment and the valve member moves to an open position due to the reduced pressure difference between the compartments. Air with ambient pressure will now be present in the both compartments on the opposite sides of the piston making it possible for an operator to move the teat cups to a teat attaching position.

BRIEF DESCRIPTION OF THE DRAWINGS

In the following, preferred embodiments of the invention are described by examples and with references to the attached drawings, in which.

BRIEF DESCRIPTION OF PREFERRED EMBODIMENTS OF THE INVENTION

Figure 1:
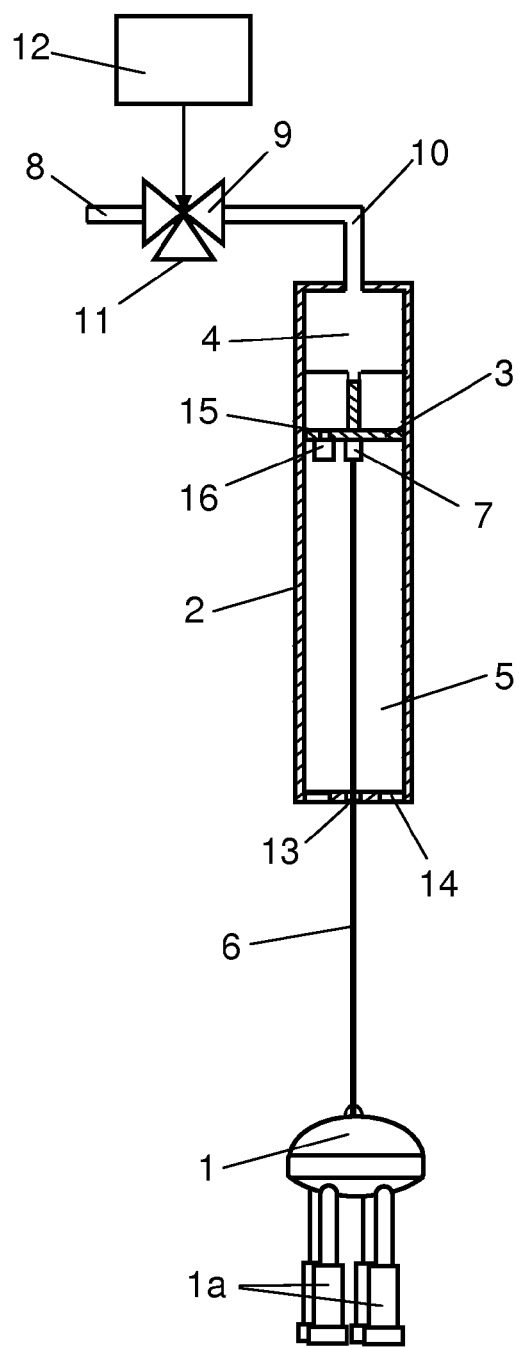
FIG. 1 shows a device for removing a cluster from an animal according to the invention.

The FIG. 1 shows a device for removing a cluster comprising a claw 1 and four teat cups 1a from an animal after a milking process has been finished. The milked animal can be a cow. The device is preferably arranged in a milking stall. The device comprises an elongated cylinder 2 provided with a movable piston 3 dividing an inner space of the cylinder 2 in a first compartment 4 and a second compartment 5. In this case, the cylinder 2 is mounted in a vertical position. The piston 3 is connected to an end portion of a cord 6 via a releasable connection 7. The opposite end portion of the cord 6 is connected to the claw 1. The device is connected to a vacuum source via a vacuum conduit 8. A valve mechanism 9 is connected to the vacuum conduit 8. The valve mechanism 9 is also connected to a connecting conduit 10 containing a passage connecting the valve mechanism 9 and the first compartment 4 of the cylinder. The valve mechanism 9 is also connected to a port 11 which is in communication with ambient air.

The valve mechanism 9 is movably arranged between a first position and a second position. In the first position, the valve mechanism 9 connects the vacuum conduit 8 to the connecting conduit 10. In this case, vacuum is applied to first compartment 4 via the connecting conduit 10. In the second position, the valve mechanism 9 connects the port 11 to the connecting conduit 10. In this case, air of ambient pressure is supplied to first compartment 4 via the connecting conduit 10. A control unit 12 is adapted to control the valve mechanism 9. The control unit 12 can be a computer device provided with suitable software for this purpose. The cylinder 2 has an opening 13 for the cord 6 in an end portion of the second compartment 5. The cylinder 2 has also at least one further opening 14 in the end portion of the second compartment 5 constituting an air passage between the second compartment 5 and ambient air. Consequently, the second compartment 5 is permanently connected to air of ambient pressure. The piston 3 is provided with a passage 15 having an extension between the first compartment 4 and the second compartment 5. A valve member 16 is arranged in the passage 15. The valve member 16 is movably arranged between an open position, in which it allows a flow of air through the passage 15 between the compartments 4, 5 and, in a closed position, in which it prevents such a flow.

Figure 2:
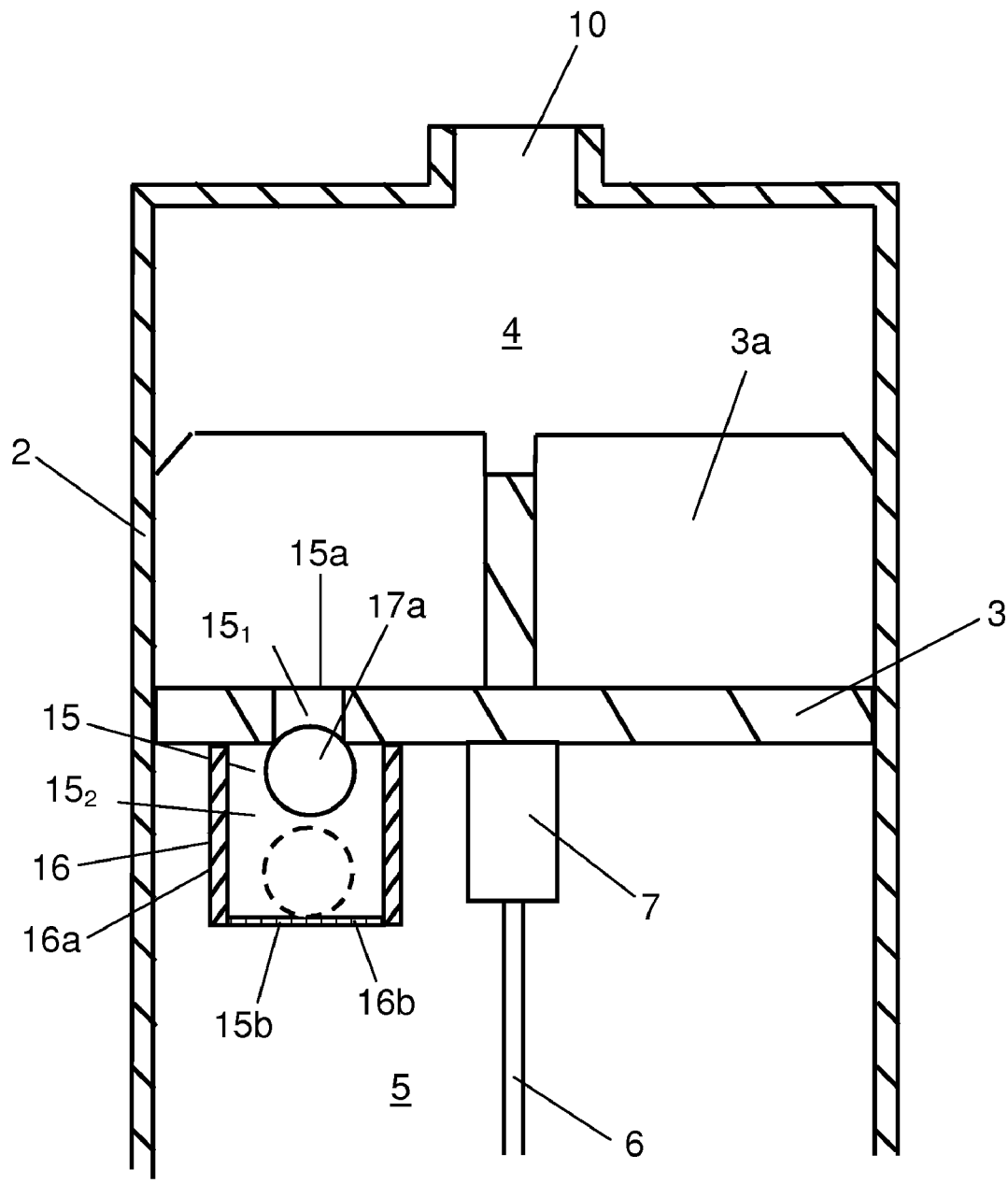
FIG. 2 shows the piston and the valve member in FIG. 1 more in detail.

FIG. 2 shows the valve member 16 more in detail. The valve member 16 comprises a tubular housing 16a which is attached to a lower surface of the piston 3. The passage 15 between the first compartment 4 and the second compartment 5 comprises a first part $15_1$ formed by a hole having an extension through the piston 3. The hole has a circular cross section area. The passage 15 comprises a second part $15_2$ formed by the inner space of the tubular housing 16a. The first part of the passage $15_1$ has a smaller cross-section area than the second part of the passage $15_2$. The first part of the passage $15_1$ has an opening 15a to the first compartment 4. The second part of the passage $15_2$ has an opening 15b to the second compartment 5. A net-shaped member 16b is mounted in the opening 15b of the second part of the passage $15_2$. A ball element 17a is arranged inside the second part of the passage $15_2$. The ball element 17a has a size such that it is movable in a vertical direction and in a horizontal direction inside the second part of the passage $15_2$. However, the ball element 17a has a larger diameter than the diameter of the first part of the passage $15_1$. The piston 3 is provided with guiding elements 3a adapted to guarantee a correct positioning of the piston 3 inside the cylinder 2.

When a milking process of an animal has been finished, the device is adapted to remove the teat cups 1a from the teats of the animal. The control unit 12 moves the valve mechanism 9 to the first position. The valve mechanism 9 connects the vacuum conduit 8 to the connecting conduit 10 such that vacuum is applied to the first compartment 4 of the cylinder. Since ambient pressure is present in the second compartment 5, a pressure difference is created between the compartments 4, 5 on opposite sides of the piston 3. The vacuum pressure in the first compartment 4 provides a sucking force in the passage 15 moving the ball element 17a upwardly towards the first part of the passage $15_1$. Since the ball element 17a has a larger diameter than the first part $15_1$ of the passage, the motion of the ball element 17a is stopped in a transition area between the first part $15_1$ and the second part $15_2$ of the passage. In this position, the ball element 17a completely blocks the passage 15 such that airflow through the passage 15 is effectively prevented. Consequently, the valve member 16 is automatically moved to a closed position when the valve mechanism 9 is moved to the first position and vacuum is applied to the first compartment 4. In the closed position, the valve member 16 maintains the pressure different between the compartments 4, 5. The pressure difference between the compartments 4, 5 provides a displacement motion of the piston 3. The displacement motion of the piston 3 results in corresponding motions of the cord 6 and the claw 1, which remove the teat cups 1a from the teats of the animal. The motion of the piston 3 proceeds until it reaches an upper end portion of the cylinder 2. In this position, the teat cups 1a are in a storing position.

When a following animal enters the milking stall, the control unit 12 moves the valve mechanism 9 to the second position. Alternatively, an operator can move the valve mechanism 9 to the second position. In the second position, the valve mechanism 9 connects the port 11 to the connecting conduit 10 such that air of ambient pressure is supplied to the first compartment 4. Since ambient pressure is present in the second compartment 5, no pressure difference is created between the compartments 4, 5 on the opposite sides of the piston 3. The sucking force on the ball element 17a ceases and the ball element 17a falls downwards in the second part of the passage $15_2$ by the force of gravity to a position on the net-like element 16b. FIG. 2 shows with broken lines the ball element 17a in this position. The ball element 17a has a size such that there is a free space on at least one side of the ball element 17 in the second part of the passage $15_2$. The existence of this free space guarantees that air can to flow past the ball element 17a and through the passage 15 between the first compartment 4 and the second compartment 5.

When the teat cups are to be attached to the teats of the animal, the operator grips the claw 1 and moves it from the storing position to a teat attaching position. This motion of the claw 1 results in a corresponding motion of the cord 6 and the piston 3 in the cylinder 2. The motion of the piston 3 in the cylinder 2 creates an expansion of the space in the first compartment 4 and a contraction of the space in the second compartment 5. It is therefore necessary to supply air to the first compartment 4 and remove air from the second compartment 5 during this motion in order to avoid creation of pressure difference between the compartments 4, 5. The motion resistance of the piston 3 in the cylinder 2 is related to the value of the pressure difference.

In conventional removing cylinders, air is supplied to the first compartment 4 by a flow passage, which corresponds to the port 11, the valve mechanism 9 and the connecting conduit 10 in FIG. 1. The air in the second compartment 5 can be removed through openings 14 in an end portion of the cylinder 2. Usually, the passage for supplying air to the first compartment 4 has a considerably smaller cross section area than the cross section area in the cylinder 2. As a consequence, it takes energy to suck air into the first compartment 4 and pump air from the second compartment 5 through these air passages. An operator usually has to provide a relatively large force for moving the claw 1 connected to a conventional removing cylinder from a storing position to a teat cup attaching position. If this motion is repeated frequently, it can be strenuous for the operator.

According to the invention, the valve member 16 is automatically moved to the open position when the valve mechanism is moved to the second position and air of ambient pressure is supplied to the first compartment 4. In the open position, the valve member 16 allows a free flow of air between the compartments 4, 5. It is here possible for the air in the successively contracting second compartment 5 to flow, via the passage 15, to the successively expanding first compartment 4 during the motion of the claw to the teat attaching position. This direct flow of air from the second compartment 5 to the first compartment 4 reduces at least partly the need of air supply through the ordinary passage 9-11 and the discharge of air through the ordinary opening 14. In this case, the passage 15 forms an additional air passage which helps to equalize the pressure difference between the compartments 4, 5 during the motion of the claw 1 to the teat attaching position. Therefore, the creation of large pressure differences on opposite sides of the piston is prevented in an effective manner also when the operator moves the claw with a relative high speed. Consequently, it is possible for an operator to move the claw 1 from a storing position to a teat cup attaching position by means of a relatively small force. Since the valve member 16 also is automatically positioned in the closed position when vacuum is applied to the first compartment 4, the existence of the valve member 16 has no negative influences on the action of the removing device during the teat cup 1a removing process.

Figure 3:
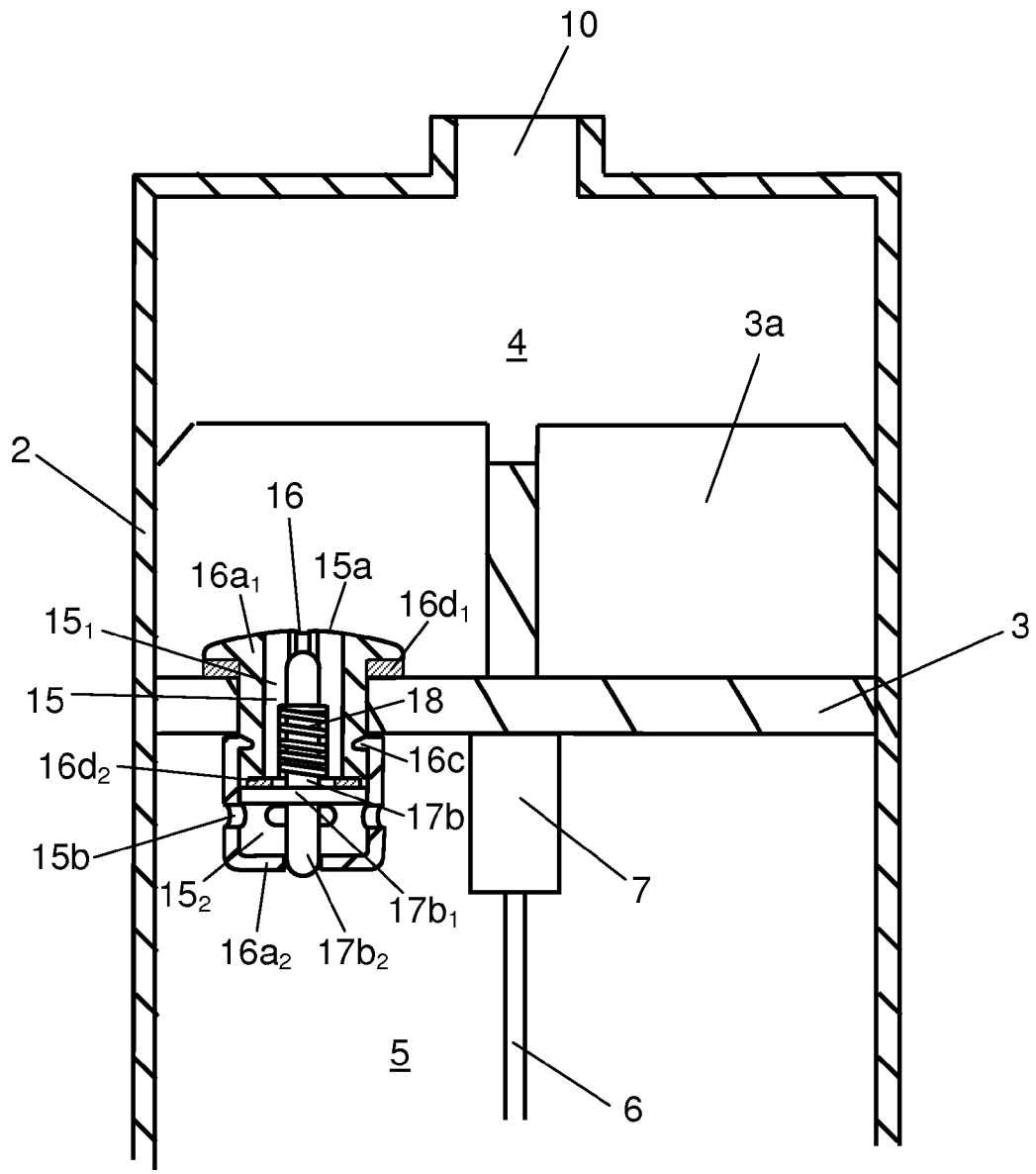
FIG. 3 shows an alternative embodiment of the valve member

FIG. 3 shows an alternative valve member 16 comprising a housing including a first house part $16a_1$ and a second house part $16a_2$. The first house part $16a_1$ is mounted from an upper side of the piston 3 into a through hole in the piston 3. The second house part $16a_2$ is mounted from a lower side of the piston 3. The first house part $16a_1$ and the second house part $16a_2$ are provided with correspondingly shaped connecting portions which are adapted to be moved together such that they form a snap in connection 16c holding the house parts together in a connected state on the piston 3. A first sealing ring $16d_1$ is mounted in a position between a surface of the first house part $16a_1$ and an upper surface of the piston 3. The valve member 16 comprises a passage 15 having an extension between an opening 15a to the first compartment 4 and a plurality of openings 15b to second compartment 5. The first house part $16a_1$ defines a first part $15_1$ of the passage 15 and the second house part $16a_2$ defines a second part $15_2$ of the passage 15. A moveable piston element 17b is mounted in the passage 15. The piston element 17b comprises a disc part $17b_1$ and a rod part $17b_2$. A spring element 18 is adapted to be mounted such that it exerts a spring force on the piston element 17b. A second sealing ring $16d_2$ is mounted between a surface of the first house part $16a_1$ and an upper surface of the disc-shaped part $17b_1$. The piston element 17b is movably arranged in the second part of the passage $15_2$ between a first upper position in which it closes the passage 15 and a second lower upper position in which it opens the passage 15.

When the control unit 12 moves the valve mechanism 9 to the first position, vacuum is applied to the first compartment 4 of the cylinder. Since ambient pressure is present in the second compartment 5, a pressure difference is created between the compartments 4, 5 on the opposite sides of the piston 3. The vacuum pressure in the first compartment 4 provides a sucking force in the passage 15 moving the piston element 17b in an upward direction. Since the disc part $17b_1$ has a larger diameter than the first part $15_1$ of the passage, the motion of the piston element 17b is stopped when the disc part $17b_1$ is in a transition area between the first part $15_1$ and the second part $15_2$ of the passage. In this position, the contact surfaces of the piston element 17b and the second sealing ring $16d_2$ completely blocks the passage 15 such that airflow through the passage 15 is effectively prevented. Consequently, the valve member 16 is automatically moved to a closed position when vacuum pressure is applied to the first compartment 4. This position is illustrated in FIG. 3.

When the control unit 12 moves the valve mechanism 9 to the second position, ambient pressure is supplied to the first compartment 4 of the cylinder. Since ambient pressure is present in the second compartment 5, no pressure difference is created between the compartments 4, 5 on the opposite sides of the piston 3. The sucking force on the piston element 17b ceases and the piston element 17 is forced downwards in the second part of the passage $15_2$ to an open position by the means of the spring 18. In this position, the disc part $17b_1$ is on a lower level than the openings 15b such that air can flow freely through the passage 15 between the first compartment 4 and the second compartment 5. Consequently, the valve member 16 is also in this case automatically moved to an open position when air of ambient pressure is supplied to the first compartment 4.

Figure 4:
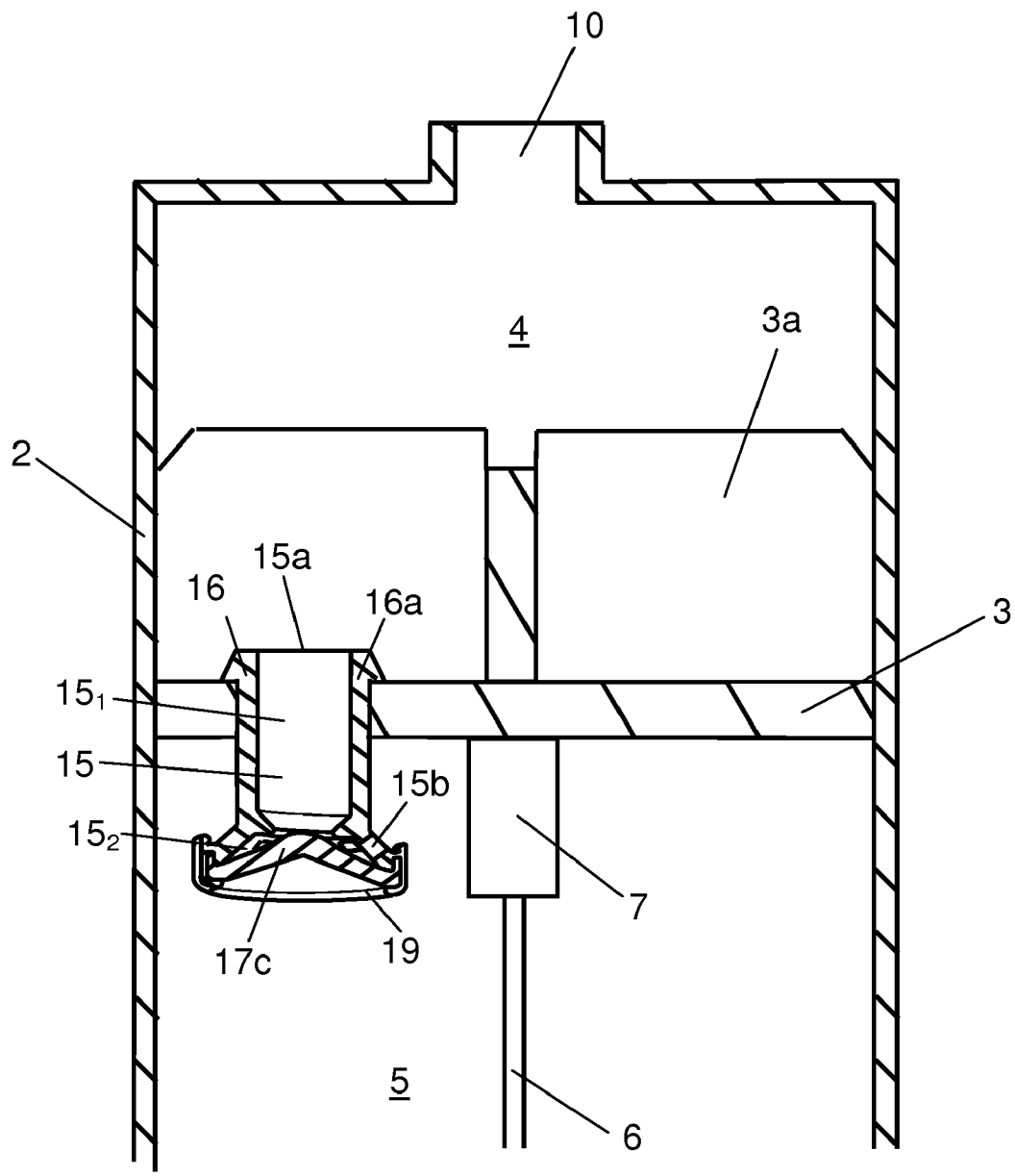
FIG. 4 shows a further alternative embodiment of the valve member and FIG. 5 shows a device with an alternative positioning of the valve member.

FIG. 4 shows a further alternative valve member 16 comprising a housing 16a made of an elastic material. The housing 16a is mounted from a lower side of the piston 3 into a through hole in the piston 3. The valve member 16 comprises a passage 15 having an extension between an opening 15a to the first compartment 4 and several openings 15b to the second compartment 5. The housing 16a has a shape which defines a first part $15_1$ of the passage 15 and a second part $15_2$ of the passage 15. A membrane element 17c is mounted in the second part of the passage $15_2$ by means of a casing 19. The membrane element 17c has elastic properties.

When the control unit 12 moves the valve mechanism 9 to the first position, vacuum is applied to the first compartment 4 of the cylinder. Since ambient pressure is present in the second compartment 5, a pressure difference is created between the compartments 4, 5 on the opposite sides of the piston 3. The vacuum pressure in the first compartment 4 provides a sucking force in the passage 15 moving at least a centre part of the membrane element 17c upwards. Since the membrane element 17c has a larger diameter than the first part $15_1$ of the passage, the motion of the membrane element 17c is stopped in a transition area between the first part $15_1$ and the second part $15_2$ of the passage. In this position, the membrane element 17c completely blocks the passage 15 such that airflow through the passage 15 is effectively prevented.

When the control unit 12 moves the valve mechanism 9 to the second position, ambient pressure is supplied to the first compartment 4 of the cylinder. Since ambient pressure is present in the second compartment 5, no pressure difference is created between the compartments 4, 5 on opposite sides of the piston 3. The sucking force acting on the membrane element 17c ceases and the centre part of the membrane element 17 is forced down in the second part of the passage $15_2$ by the means of its resilient properties to an open position. The membrane element 17c allows in this position a free flow of air through the passage 15 between the first compartment 4 and the second compartment 5.

Figure 5:
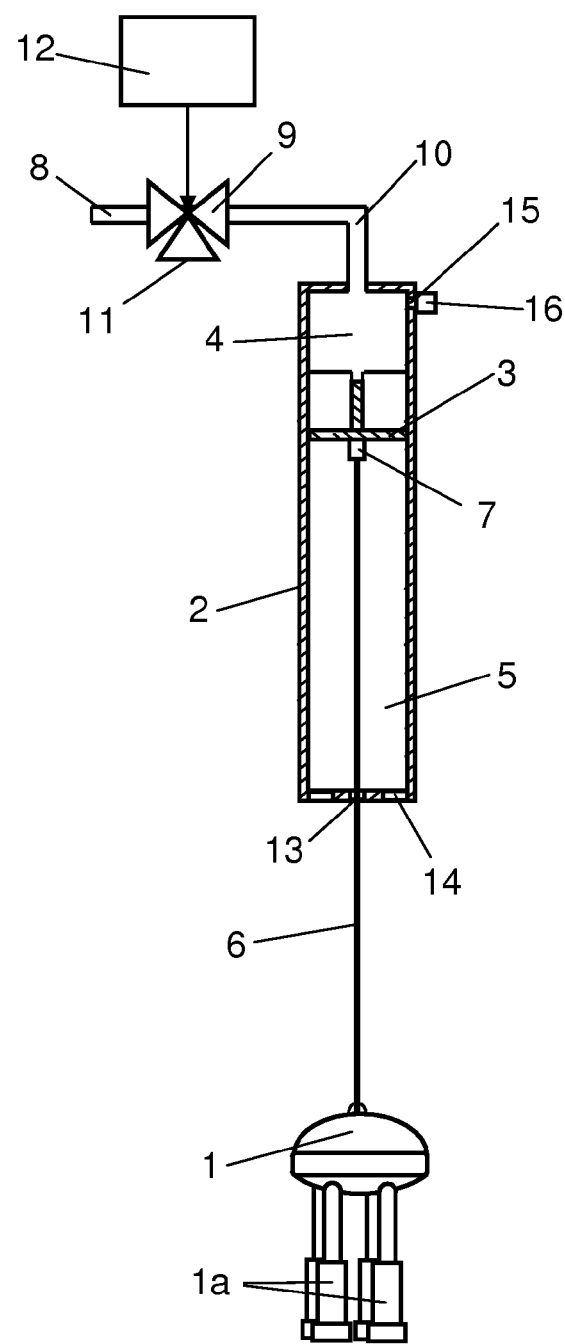

FIG. 5 shows an embodiment of the device where the passage 15 and the valve member 16 are arranged in an alternative position. In this case, the passage 15 has an extension trough a wall of an upper part of the cylinder 2 such that it connects the first compartment 4 with ambient air located outside the cylinder 2. The valve member 16 is here attached to the wall of the cylinder. The valve member 16 may have a corresponding construction and be controlled in a similar manner as the valve members 16 shown in FIGS. 2 to 4. Usually, the air passage to the first compartment 4, which is defined by the valve mechanism 9 and the connecting conduit 10, has a considerably higher flow resistance than the air passage to the second compartment 5, which is defined by the openings 13, 14. Therefore, the pressure difference acting on the piston 3 during its motion depends mainly of the negative pressure in the first chamber 4. However, the existence of the passage 15 and the valve member 16 facilitates the air supply to the first chamber 4 from ambient air. When the valve member 16 is open it is possible to move the teat cups 1a from a storing position to a teat cup attaching position by a considerably lower force and with a higher speed than with a conventional device.

The invention is not limited to the described embodiments but may be varied and modified freely within the scope of the claims. The cylinder 2 does not need to be vertically placed. The cylinder 2 can be horizontally placed or be inclined in an arbitrary direction.

The invention claimed is:

1. A device for removing a teat cup (1a) from a teat of an animal, the device comprising:
a cylinder (2) provided with a movable piston (3) dividing an inner space of the cylinder into i) a first compartment (4) and ii) a second compartment (5), the second compartment (5) permanently connected to ambient air;
a connector (1, 6) extending from the piston for connection to the teat cup (1a); and
a valve mechanism (9) with i) a vacuum source connection (8) for connection to a vacuum source, ii) a connection to the first compartment (4) of the cylinder, and iii) a port in communication with ambient air, the valve mechanism being movable between a first position and a second position, in the first position the valve mechanism connects the vacuum source connection to the connection to the first compartment of the cylinder to subject the first compartment to vacuum, in the second position the valve mechanism connects the port in communication with the ambient air to the connection to the first compartment of the cylinder to subject the first compartment to ambient air pressure, wherein the piston (3) is adapted to provide a motion, when the valve mechanism (9) is in the first position, which removes the teat cup (1a) from the animal and moves the teat cup (1a) to a teat cup storing position, wherein said cylinder (2) further comprises i) an air passage (15) between the first compartment (4) and the second compartment (5), and ii) a passage valve member (16), the passage valve member (16) allowing a flow of air through the passage (15) with the passage valve member (16) in an open position, the passage valve member (16) preventing the flow of air through the passage (15) with the passage valve member (16) in a closed position, and the passage valve member (16) is adapted to be moved to the open position when the valve mechanism (9) is in the second position, the passage valve member movement controlled by a pressure difference between the first compartment (4) and ambient pressure such that the passage valve member is moved to the open position when the pressure difference is lower than a predetermined value.

2. The device of claim 1, further comprising:

a control unit (12) connected to the valve mechanism (9) for controlling moving the valve mechanism (9) between the first and second positions, the control unit (12) adapted to move the valve mechanism (9) to the first position upon finishing a milking process of the animal.

3. The device according to claim 2, wherein said passage (15) comprises an extension through the piston (3).

4. The device according to claim 3, wherein the passage valve member (16) is attached to the piston.

5. The device according to claim 2, wherein said passage valve member (16) is adapted to be controlled by a pressure difference between the first compartment (4) and ambient pressure such that the passage valve member (16) is moved to the open position when the pressure difference is lower than a predetermined value.

6. The device according to claim 5, wherein the passage valve member (16) comprises a movable element (17a, 17b, 17c) which is movably arranged between the open position in which the passage valve member (16) allows the flow of air through the passage (15) and the closed position in which the passage valve member (16) blocks the passage (15).

7. The device according to claim 6, wherein the movable element (17a) is adapted to be movable to the open position by the force of gravity when the valve mechanism (9) has been moved to the second position.

8. The device according to claim 6, wherein the movable element is a ball element (17a).

9. The device according to claim 6, wherein the movable element (17b, 17c) is adapted to be moved to the open position by a resilient element (18) when the valve mechanism (9) has been moved to the second position.

10. The device according to claim 9, wherein the movable element is a movable piston element (17b) and the resilient element is a spring element (18).

11. The device according to claim 9, wherein the movable element is a membrane element (17c) having elastic properties adapted to move to the open position when the valve mechanism (9) has been moved to the second position.

12. The device according to claim 5, wherein the passage valve member (16) is adapted to be controlled by the pressure difference between the first compartment (4) and ambient pressure such that the passage valve member is moved to the closed position when the pressure difference is higher than a predetermined value.

13. The device according to claim 2, wherein said cylinder (2) further comprises at least one passage (14) connecting the second compartment (5) to the ambient air.

14. The device according to claim 2, wherein said valve mechanism (9) is adapted to connect the first compartment (4) to ambient air when the valve mechanism in the second position.

15. A device for removing at least one teat cup (1a) from a teat of an animal, the device comprising:

a cylinder (2) provided with a movable piston (3) dividing an inner space of the cylinder into a first compartment (4) and a second compartment (5) permanently connected to ambient air;

a connection (1, 6) between the piston (3) and at least one teat cup (1a); and a valve mechanism (9) adapted to connect a vacuum source (8) to the first compartment (4) when the valve mechanism is in a first position and to disconnect the vacuum source from the first compartment when the valve mechanism is in a second position, wherein the piston (3) is adapted to provide a motion, when the valve mechanism (9) is in the first position, which motion removes the at least one teat cup (1a) from the animal and moves the at least one teat cup (1a) to a teat cup storing position, the cylinder (2) further comprising an air passage (15) leading into the first compartment (4) and a passage valve member (16) that allows a flow of air through the passage (15) in an open position and prevents the flow of air through the passage (15) in a closed position, wherein the passage valve member (16) is adapted to be moved to the open position when the valve mechanism (9) is in the second position.

16. A device for removing a teat cup (1a) from a teat of an animal, the device comprising:

a cylinder (2) comprised of a movable piston (3) dividing an inner space of the cylinder into i) a first compartment (4) and ii) a second compartment (5);

a connector (1, 6) extending from the piston for connection to the teat cup (1a); and a valve mechanism (9) with i) a vacuum source connection (8), ii) a connection to the first compartment (4), and iii) a connection for communication with ambient air, the valve mechanism being movable between a first position and a second position, in the first position the valve mechanism connecting a vacuum to the first compartment, in the second position the valve mechanism connecting the ambient air to the first compartment, with the valve mechanism (9) in the first position, the piston (3) providing a motion which removes the teat cup (1a) from the animal, wherein said cylinder (2) further comprises i) a passage (15) between the first compartment (4) and the second compartment (5), and ii) a passage valve member (16), the passage valve member (16) allowing a flow of air through the passage (15) with the passage valve member (16) in an open position, the passage valve member (16) preventing the flow of air through the passage (15) with the passage valve member (16) in a closed position, and the passage valve member (16) moving to the open position when the valve mechanism (9) is in the second position.

17. The device of claim 16, further comprising:

a control unit (12) connected to the valve mechanism (9) for controlling moving the valve mechanism (9) between the first and second positions, wherein said passage valve member (16) is controlled by a pressure difference between the first compartment (4) and ambient pressure such that the passage valve member (16) is moved to the open position when the pressure difference is lower than a predetermined value.

* * * * *